United States Patent [19]

Hergenrother et al.

[11] Patent Number: 4,788,271

[45] Date of Patent: Nov. 29, 1988

[54] POLYPHENYLQUINOXALINES CONTAINING ALKYLENEDIOXY GROUPS

[75] Inventors: Paul M. Hergenrother, Yorktown; Stephen J. Havens, Newport News, both of Va.; Frank W. Harris, Akron, Ohio

[73] Assignee: The United States of America as represented by the United States National Aeronautics and Space Administration, Washington, D.C.

[21] Appl. No.: 28,831

[22] Filed: Mar. 23, 1987

[51] Int. Cl.[4] .................... C08G 73/06; C08G 33/02
[52] U.S. Cl. ...................................... 528/125; 528/128
[58] Field of Search ................................ 528/125, 128

[56] References Cited

U.S. PATENT DOCUMENTS

| | | | |
|---|---|---|---|
| 3,661,850 | 5/1972 | Stille | 528/125 |
| 3,766,141 | 10/1973 | Augl et al. | 528/125 |
| 3,792,017 | 2/1974 | Arnold et al. | 528/125 |
| 3,852,243 | 12/1974 | Hergenrother | 528/125 |
| 3,852,244 | 12/1974 | Heath et al. | 528/125 |
| 3,956,238 | 5/1976 | Heath | 528/125 |
| 3,966,729 | 5/1976 | Kovar et al. | 528/125 |
| 4,375,536 | 3/1983 | Hergenrother | 528/125 |

Primary Examiner—Harold D. Anderson
Assistant Examiner—Frederick F. Krass
Attorney, Agent, or Firm—George F. Helfrich; John R. Manning; Charles E. B. Glenn

[57] ABSTRACT

New polyphenylquinoxalines have been prepared from the reaction of novel bis(α-diketones) with aromatic bis(o-diamines). These polyphenylquinoxalines have lower glass transition temperatures and melt viscosities and consequently better processability than known polyphenylquinoxalines. The properties of these new polyphenylquinoxalines (tensile strength, modulus, elongation, adhesive strength, fracture energy, and solvent resistance) are comparable with the properties of known polyphenylquinoxalines.

1 Claim, 1 Drawing Sheet

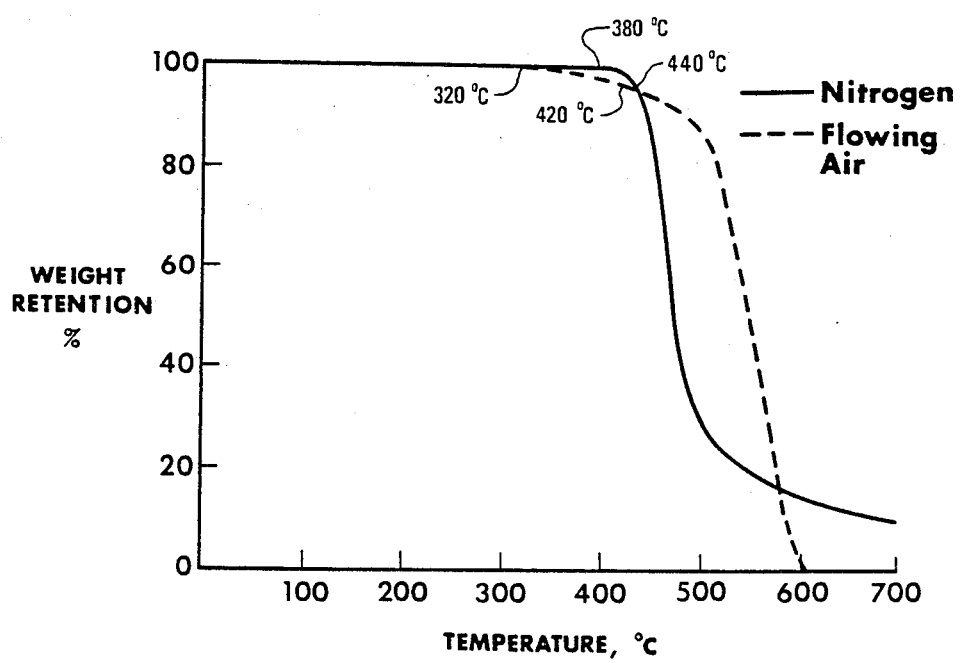

POLYPHENYLQUINOXALINES CONTAINING ALKYLENEDIOXY GROUPS

ORIGIN OF THE INVENTION

The invention described herein was jointly made by employees of the U.S. Government and contract employees in the performance of work under NASA contracts and is subject to the provisions of Public Law 95-517 (35 USC 202) in which the contractor has elected not to retain title and/or the provisions of Section 305 of the National Aeronautics and Space Act of 1958, Public Law 85-568 (72 Stat. 435; 42 USC 2457).

TECHNICAL FIELD OF THE INVENTION

This invention relates to condensation polymers and in particular to polyphenylquinoxalines containing alkylenedioxy groups in their repeat units that are useful as adhesives, coatings, films, membranes, and composite matrices.

BACKGROUND OF THE INVENTION

Polyphenylquinoxalines (PPQ) are condensation polymers commonly synthesized by the reaction of bis($\alpha$-diketones) with aromatic bis(o-diamines) and having a repeat unit of the general type

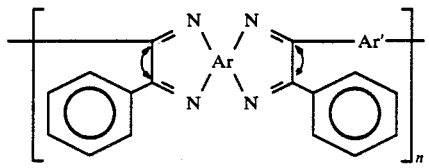

Ar is a tetravalent aromatic radical which can be as simple as 1,2,4,5-tetrasubstituted benzene. Ar may be a bis(o-diphenylene) having the general structure

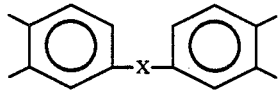

where X=nil, O, S, SO$_2$, C=O, etc., or Ar may be any other appropriate tetravalent radical. Ar' is a divalent aromatic radical which may be 1,3-phenylene, 1,4-phenylene, 4,4'-biphenylene, 4,4'-oxydiphenylene, 4,4'-thiodiphenylene, 4,4'-carbonyldiphenylene, 4,4'-methanediphenylene, or any other appropriate divalent radical.

Synthesis and characterization of polyphenylquinoxalines has been extensively reported in the literature. The initial report was in 1967 [P. M. Hergenrother, J. Polym. Sci. A-1, 5, 1453 (1967)] with a patent awarded in 1973 [J. M. Augl and W. J. Wrasidlo, U.S. Pat. No. 3,766,141 (Oct. 16, 1973) (to U.S. Navy)]. A review on polyphenylquinoxalines was published in 1971 [P. M. Hergenrother, J. Macromolecular Science-Reviews in Macromolecular Chemistry, C6(1), 1(1971)]. For the most part the Ar' part of the bis($\alpha$-diketones) is wholly aromatic. This is desirable if exceptionally high thermal stability is required, but glass transition temperatures tend to be high (more than 250° C.) and processing temperatures much higher (more than 300° C.). Little research has been attempted to significantly reduce the processing temperatures of polyphenylquinoxalines.

The incorporation of a flexibilizing segment such as an aliphatic or an alkylenedioxy group into the repeat unit of an aromatic/heterocyclic polymer is an effective means of reducing the glass transition temperature and improving processability. Ethylenedioxy groups have been incorporated into the main chain of polyimides [W. A. Feld et al., J. of Polym. Sci. Polymer Chem. Ed., 21, 319(1983); F. W. Harris et al., Polymer Preprints, 25(1), 160(1984); and F. W. Harris et al., Ibid., 26(2), 287(1985)]. Significant reductions in glass transition temperatures and increased melt flow at elevated temperatures were observed.

Polyphenylquinoxalines are more readily prepared than polyimides, not requiring elevated temperatures for ring closure. It would therefore be useful to incorporate into polyphenylquinoxalines some flexibilizing alkylenedioxy segments in such a manner as to reduce glass transition temperature and improve processability while not significantly reducing the excellent mechanical properties. P. M. Hergenrother [J. Polym. Sci., Part A-1, 6, 3170(1968)] reported the synthesis of two polyphenylquinoxalines containing hexylene linking groups in the Ar' segment. Characterization of these polymers was limited to inherent viscosities and determination of polymer decomposition temperature in air and nitrogen. There was no mention of glass transition temperatures or processability of these polymers. Thus, the use of flexibilizing groups in polyphenylquinoxalines has not been fully utilized.

The flexibilizing alkylenedioxy unit could be incorporated into either the Ar [bis(o-diamine)] or the Ar' [bis-($\alpha$-diketone)] portion of the polyphenylquinoxaline repeat unit. In either case the synthesis of the new monomers containing the flexible segment would require several steps for preparation from commercially available materials.

A primary object of the present invention is to provide new polyphenylquinoxalines that are useful as adhesives, coatings, films, membranes, and composite matrices.

Another primary object of the present invention is the synthesis of five new monomers, the 4,4'-($\alpha$,$\omega$-diphenoxyalkyl) bis(phenylethanediones), where $\alpha$,$\omega$ represent terminally substituted alkanes containing two to six carbon atoms.

SUMMARY OF THE INVENTION

The present invention is a new composition of matter and concerns new processable polyphenylquinoxalines and novel monomers, and the process for preparing same.

According to the present invention, the foregoing and additional objects were obtained by synthesizing polyphenylquinoxalines containing alkylenedioxy groups in their repeat units. The glass transition temperature of the polyphenylquinoxalines ranged between 203° C. and 241° C., decreasing with increasing length of the alkylenedioxy group. The polyphenylquinoxalines were readily compression molded at 300°-320° C. under 150 psi. Solution cast films were tough and flexible. Tensile strength, tensile modulus, and elongation at room temperature were as high as 14,400 psi, 378,000 psi, and 8.1%, respectively. Toughness, as measured by fracture energy (G$_{Ic}$) was as high as 10.5 in-lb/in$^2$. Titanium to titanium tensile shear strength at room temperature was as high as 4400 psi. The polyphenylquinoxalines were resistant to normal aircraft fluids but were soluble in chlorinated solvents.

BRIEF DESCRIPTION OF THE DRAWING

FIG. 1 represents the thermogravimetric analysis curves of PPQ (3c) in nitrogen and flowing air, the heating rate being 2.5° C./min and the sample being in the form of powder.

DETAILED DESCRIPTION OF THE INVENTION

The general reaction sequence for synthesis of the novel bis(α-diketones) is represented by the following equations:

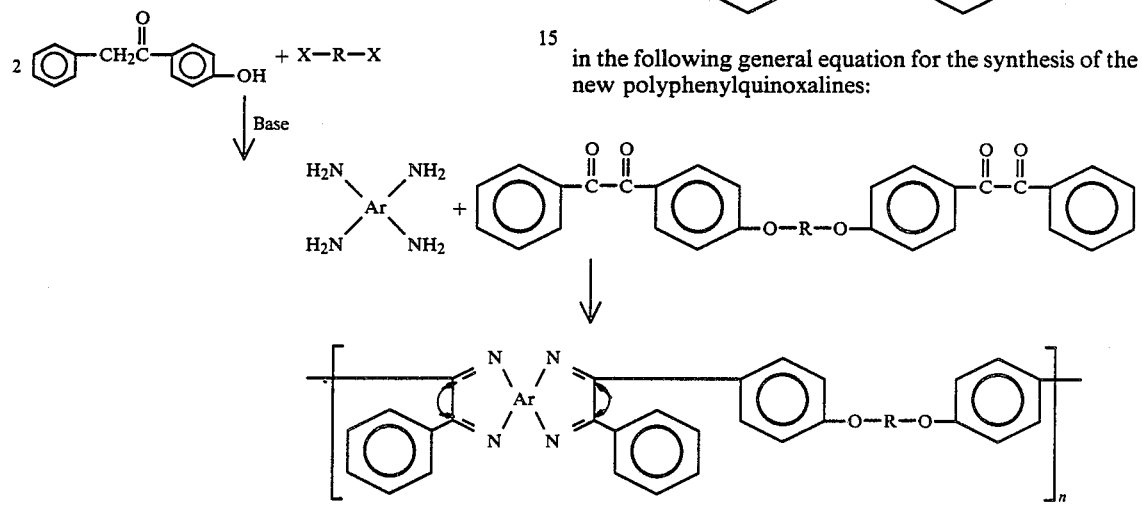

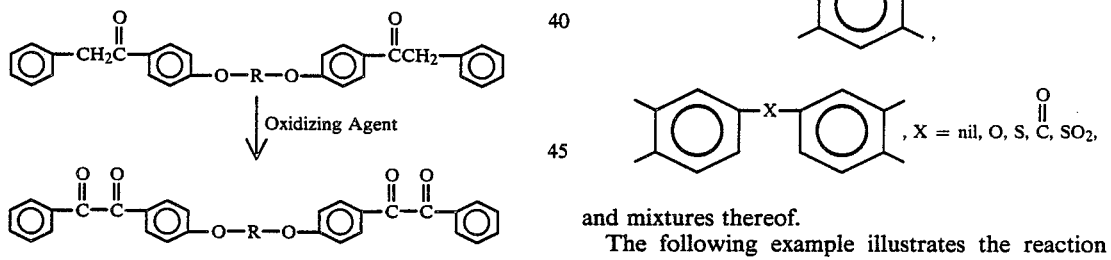

where: X is either a chlorine or bromine atom.

The base is an alkali metal hydroxide or carbonate selected from NaOH, KOH, Na₂CO₃, K₂CO₃.

The oxidizing agent is a transition metal oxide, preferably SeO₂.

R is selected from a group of radicals consisting of $-(CH_2)_x-$, x = 2-10, $-(CH_2OCH_2)_x-$, x = 1-8, $-(CH_2CH_2OCH_2CH_2)_x-$, x = 1-4,

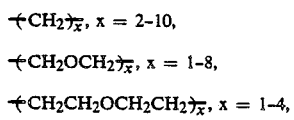, x = 1-4,

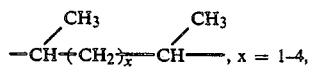, x = 1-4,

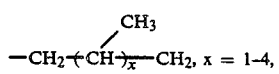

and mixtures thereof.

Therefore Ar' is equivalent to

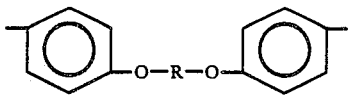

in the following general equation for the synthesis of the new polyphenylquinoxalines:

where n is an integer from 4–100 repeat units, Ar is selected from a group of radicals consisting of

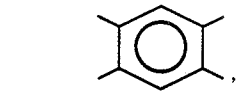,

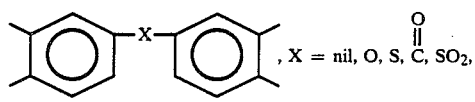, X = nil, O, S, $\overset{O}{\underset{\|}{C}}$, SO₂, and mixtures thereof.

The following example illustrates the reaction sequence for the synthesis of the polyphenylquinoxaline in the case where Ar is

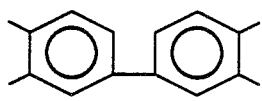

and R is —(CH₂)₄—. The invention is not limited to this example.

EXAMPLES

Monomer Synthesis (A) 4,4'-Bis(phenylacetyl)-1,4-diphenoxybutane

Benzyl 4-hydroxyphenyl ketone (10.66 g, 0.050 mol) and 1,4-dibromobutane (5.40 g, 0.025 mol), both purchased from Aldrich Chemical Company, were dissolved in 30 mL of N,N-dimethylformamide (DMF).

Powdered anhydrous potassium carbonate (8.64 g, 0.0625 mol) was added, and the stirred mixture maintained at 130°–140° C. for four hours under a nitrogen atmosphere. The reaction mixture was allowed to cool slightly, then added to water to precipitate a gummy solid. The solid was collected by filtration, dried, stirred with methanol, and filtered to remove unreacted 1,4-dibromobutane. The 10.6 g of crude solid was recrystallized from ca. 200 mL of toluene to provide 4,4'-bis(phenylacetyl)-1,4-diphenoxybutane (9.37 g, 78% yield); melting point, 170.5°–171.5° C.; infrared spectrum (KBr), 1677 cm$^{-1}$ (very strong, sharp, C=O); proton nuclear magnetic resonance spectrum was not obtained as the compound was not soluble in any common solvent at room temperature. Elemental analysis calculated for $C_{32}H_{30}O_4$: C, 80.31%; H, 6.32%. Found: C, 80.03%; H, 6.56%.

The melting points, yields after recrystallization from toluene, and elemental analyses of a series of bis(phenylacetyl-4-phenoxy)-α,ω-alkanes (1a–e as shown in Equation (1)) are given in Table 1.

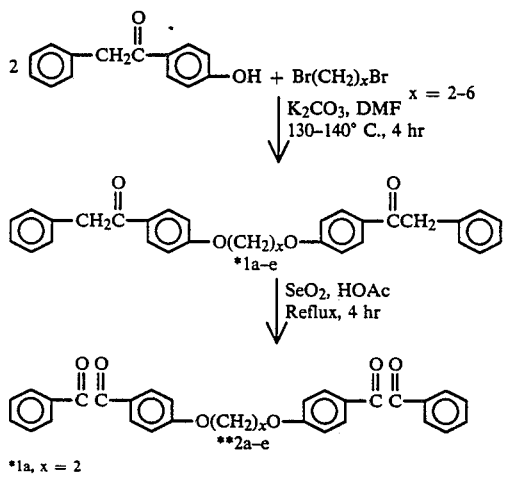

*1a, x = 2
1b, x = 3
1c, x = 4
1d, x = 5
1e, x = 6
**2a, x = 2
2b, x = 3
2c, x = 4
2d, x = 5
2e, x = 6

TABLE 1
Physical Constants of Bis(phenylacetyl-4-phenoxy)-α,ω-alkanes

| Compd | m.p., °C. | Yield$^a$ (%) | Calc. C, % | Calc. H, % | Found C, % | Found H, % |
|---|---|---|---|---|---|---|
| 1a | 184.5–186.5 | 13 | 79.98 | 5.82 | 79.87 | 6.01 |
| 1b | 137.5–139 | 67 | 80.15 | 6.07 | 80.05 | 6.17 |
| 1c | 170.5–171.5 | 78 | 80.31 | 6.32 | 80.03 | 6.56 |
| 1d | 108.5–109.5 | 68 | 80.46 | 6.55 | 80.84 | 6.81 |
| 1e | 153–156 | 86 | 80.60 | 6.76 | 79.89 | 6.92 |

$^a$Yield after recrystallization from toluene.

(B) 4,4'-(1,4-Diphenoxybutane) bis(phenylethanedione)

4,4'-Bis(phenylacetyl)-1,4-diphenoxybutane (17.23 g, 0.036 mol) and selenium dioxide (7.99 g, 0.072 mol) were stirred at reflux for four hours in 100 mL of glacial acetic acid. The hot mixture was filtered in order to remove the black suspension of selenium metal. The filtrate was allowed to cool, and the crystallized yellow solid collected by filtration and dried to provide 14.6 g of crude solid. Recrystallization from ca. 200 mL of toluene afforded 4,4'-(1,4-diphenoxybutane) bis(phenylethanedione) (13.18 g, 72% yield) as a light yellow solid; melting point, 150.5°–152° C.; infrared spectrum (KBr), 1670, 1665, and 1659 cm$^{-1}$ (strong, C=O); proton nuclear magnetic resonance spectrum determined in deuterated N,N-dimethylformamide, 1.8–2.2 (multiplet, 4H, CH$_2$), 4.23 (triplet, 4H, ArOCH$_2$, J=4.5 Hz), 7.0–8.15 (multiplet, 18H, aromatic). Elemental analysis calculated for $C_{32}H_{26}O_6$: C, 75.88%; H, 5.17%. Found: C, 75.90%; H, 5.32%.

The melting points, yields after recrystallization from toluene, and elemental analyses of bis(phenylglyoxylyl-4-phenoxy)-α,ω-alkanes (2a–e as shown in Equation (1)) are given in Table 2.

TABLE 2
Physical Constants of Bis(phenylglyoxylyl-4-phenoxy)-α,ω-alkanes

| Compd (see Eq. 1) | m.p., °C. | Yield$^a$ (%) | Calc. C, % | Calc. H, % | Found C, % | Found H, % |
|---|---|---|---|---|---|---|
| 2a | 170–173 | 45 | 75.30 | 4.63 | 75.64 | 4.86 |
| 2b | 190.5–191.5 | 72 | 75.60 | 4.91 | 75.32 | 5.06 |
| 2c | 150.5–152 | 72 | 75.88 | 5.17 | 75.90 | 5.32 |
| 2d | 143.5–145 | 79 | 76.14 | 5.42 | 76.22 | 5.65 |
| 2e | 132.5–133.5 | 77 | 76.39 | 5.66 | 76.35 | 5.88 |

$^a$Yield after recrystallization from toluene.

Polyphenylquinoxaline Synthesis 4,4'-(1,4-diphenoxybutane) bis(phenylethanedione) (10.1310 g, 0.0200 mol) was dissolved in 100 mL of m-cresol (warming) under a nitrogen atmosphere and the solution allowed to cool to room temperature. 3,3'-Diaminobenzidine (4.2854 g, 0.0200 mol) was added to the solution and the mixture stirred at room temperature for four hours, followed by heating at 120°–140° C. for two hours. The polyphenylquinoxaline was isolated by precipitation of the viscous solution in methanol, collected by filtration, boiled in methanol, filtered, and subsequently dried under vacuum at 200° C. Yield was essentially quantitative. Inherent viscosity as measured at 25° C. as a 0.5% solution in chloroform was 0.93 dL/g. Glass transition temperature as determined by differential scanning calorimetry was 220° C.

Characterization of the representative polyphenylquinoxalines (PPQ, 3a–e as shown in Equation (2)) is presented in Table 3 and a thermogravimetric analysis is shown in FIG. 1.

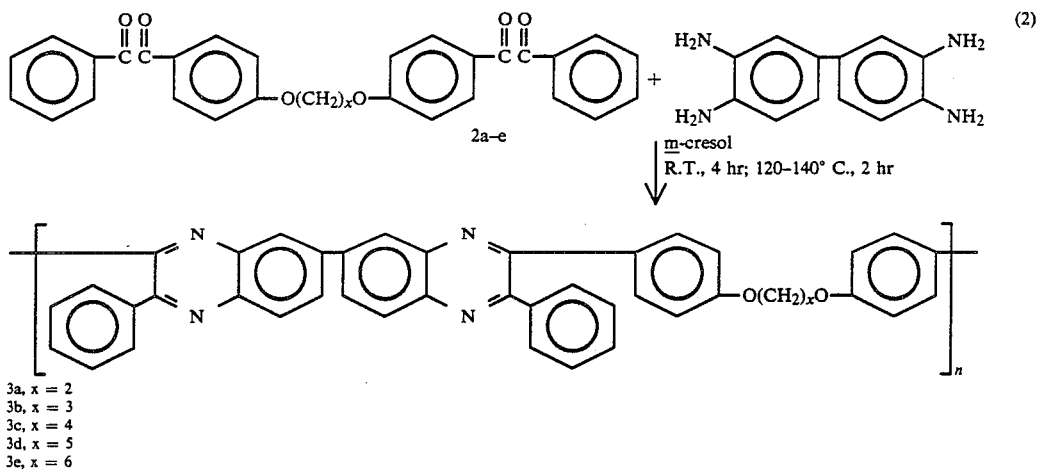

3a, x = 2
3b, x = 3
3c, x = 4
3d, x = 5
3e, x = 6

In Table 3, inherent viscosities were obtained from 0.5% solutions in chloroform at 25° C. In Tables 1 and 2 elemental analysis was performed by Galbraith Laboratories, Inc., Knoxville, Tenn. Differential scanning calorimetry (DSC) was performed at a heating rate of 20° C./min with the glass transition temperature (Tg) taken at the inflection point of ΔT versus temperature curve. Samples were heated to a temperature about 40° C. above the Tg, quenched and rerun. Torsional braid analysis (TBA) was conducted at a heating and cooling rate of 3° C./min with the Tg taken as the temperature of the damping peak during the cool-down after heating to 300° C. in nitrogen. Thermal mechanical analysis (TMA) of films in the elongation mode was performed at a heating rate of 5° C./min with 2 g added weight using the du Pont Model 940 module. In FIG. 1, the thermogravimetric analysis (TGA) was conducted at a heating rate of 2.5° C./min in flowing air or nitrogen on powder samples.

TABLE 3

| PPQ (see Eq. 2) | $n_{inh}^a$ (dL/g) | $DSC^b$ | Tg (°C.) $TBA^c$ Heat-up | Tg (°C.) $TBA^c$ Cool-down | $TMA^d$ |
|---|---|---|---|---|---|
| 3a | 0.82 | 241 | 236 | 249 | 238 |
| 3b | 1.05 | 238 | 232 | 243 | 237 |
| 3c | 0.93 | 220 | 219 | 225 | 230 |
| 3d | 1.14 | 212 | 203 | 214 | 218 |
| 3e | 1.50 | 203 | 197 | 203 | 212 |

$^a$Inherent viscosity, 0.5% solution in chloroform at 25° C.
$^b$Differential scanning calorimetry at heating rate of 20° C./min.
$^c$Torsional braid analysis at heating rate of 3° C./min.
$^d$Thermal mechanical analysis at heating rate of 5° C./min.

The thin film properties of polyphenylquinoxalines (PPQ, 3b–3e as shown in Equation (2)), including tensile yield, tensile modulus, and tensile strength and percent elongation at break, are presented in Table 4.

TABLE 4

| | Thin Film Properties of Polyphenylquinoxalines | | | | | | | |
|---|---|---|---|---|---|---|---|---|
| | Tensile Yield ($10^3$ psi) | | Tensile Strength at Break ($10^3$ psi) | | Tensile Modulus ($10^5$ psi) | | Elongation at Break (%) | |
| PPQ (see Eq. 2) | RT | 93° C. | RT | 93° C. | RT | 93° C. | RT | 93° C. |
| 3b | 7.1 | 6.7 | 14.3 | 10.6 | 3.74 | 2.98 | 7.3 | 5.6 |
| 3c | 7.3 | 7.2 | 14.4 | 10.8 | 3.78 | 2.92 | 8.1 | 10.5 |
| 3d | 7.3 | 6.5 | 12.9 | 9.8 | 2.85 | 2.54 | 10.7 | 47.6 |
| 3e | 7.3 | 6.4 | 12.7 | 9.3 | 3.08 | 2.48 | 10.7 | 12.5 |

What is new and desired to be secured by Letters Patent of the United States is:

I claim:

1. A polyphenylquinoxaline having the general structural formula:

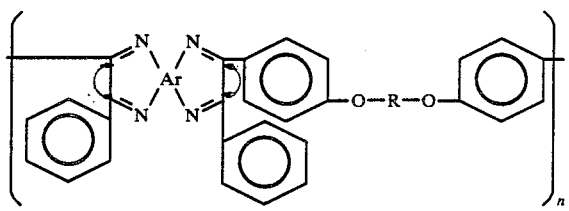

(a) wherein n is an integer between 4 and 100;
(b) wherein R is a radical selected from the group consisting of:

         x = 2–10,
                             x = 1–8,
                             x = 1–4,

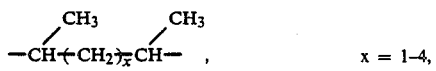         x = 1–4,

         x = 1–4, and

and
(c) wherein Ar is a radical selected from the group consisting of:
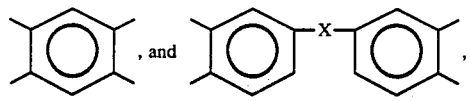
wherein X is a bond or X is a linking group selected from the group consisting of:
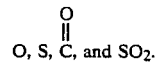
* * * * *